(12) United States Patent
Tutt et al.

(10) Patent No.: US 6,997,440 B2
(45) Date of Patent: Feb. 14, 2006

(54) PACKLESS VALVE APPARATUS

(75) Inventors: Brian J. Tutt, Brainerd, MN (US); Daryll D. Patterson, Brooklyn Park, MN (US)

(73) Assignee: Tescom Corporation, Elk River, MN (US)

( * ) Notice: Subject to any disclaimer, the term of this patent is extended or adjusted under 35 U.S.C. 154(b) by 43 days.

(21) Appl. No.: 10/811,560

(22) Filed: Mar. 29, 2004

(65) Prior Publication Data
US 2005/0211944 A1 Sep. 29, 2005

(51) Int. Cl.
*F16K 1/00* (2006.01)
*F16K 15/00* (2006.01)

(52) U.S. Cl. ..................... 251/331
(58) Field of Classification Search ........... 251/129.17, 251/331
See application file for complete search history.

(56) References Cited
U.S. PATENT DOCUMENTS

| | | | |
|---|---|---|---|
| 237,854 A * | 2/1881 | Garsed .................. 251/275 |
| 2,283,369 A * | 5/1942 | Jacobsen ................ 251/331 |
| 4,606,374 A | 8/1986 | Kolenc et al. |
| 4,684,106 A | 8/1987 | Kolenc et al. |
| 5,295,662 A | 3/1994 | Yamaji et al. |
| 5,485,984 A | 1/1996 | Itoi et al. |
| 6,092,550 A | 7/2000 | Gotch et al. |
| 6,341,758 B1 | 1/2002 | Shih et al. |

* cited by examiner

*Primary Examiner*—Edward K. Look
*Assistant Examiner*—John K. Fristoe Jr.
(74) *Attorney, Agent, or Firm*—Clayton R. Johnson

(57) ABSTRACT

The valve includes a dome shaped diaphragm clamped between a base and valve body with the base having an inlet and an outlet opening to the diaphragm and a plastic button having a concave central portion surrounded by an annular convex portion for abutting against the diaphragm to move it to a closed position against a valve seat to block fluid flow between the inlet and an outlet. In a valve open position, the button central portion abuts against the diaphragm central portion while, as the button moves to a valve closed position, the closing force is applied to the diaphragm further radial outwardly. An actuator is operable for moving a plunger against a larger diameter insert mounted in a button recess which is axially opposite the diaphragm.

19 Claims, 4 Drawing Sheets

PACKLESS VALVE APPARATUS

BACKGROUND OF THE INVENTION

This invention relates to mechanism in a valve for blocking and permitting fluid flow through the valve and more particularly, to mechanism for moving a diaphragm between valve open and closed positions.

In U.S. Pat. No. 6,189,861 to Gotch et al, there is disclosed an air actuated diaphragm valve that includes radially spaced inlet and outlet passages opening to one side of a dome shaped diaphragm while a plastic button abuts against the convex center portion of the opposite side of diaphragm. The button is formed from a suitable plastic material having lubricating qualities. The lower surface of the button is slightly convex to match the top concave surface of the valve seat.

Yamaji et al, U.S. Pat. No. 5,295,662, discloses a diaphragm valve having a synthetic resin diaphragm presser (button) abutting against the diaphragm to move it to a valve closed position abutting against a valve seat. The button is mounted by a disc, the valve stem being abuttable against the disc for moving it downwardly while the diaphragm acts to move the button and thereby the disc upwardly. The disc is of a larger diameter than the outer diameter of the valve seat. The valve seat is mounted in a recess defined by radial inner and outer valve body portions that extend to the same elevation.

U.S. Pat. No. 5,820,105 to Yamaji et al discloses a diaphragm presser (button) of a larger diameter than the inner diameter of the valve seat and is made of either synthetic resin (for example, tetrafluoroethylene resin, etc) or synthetic rubber.

Problems encountered with prior art diaphragm valves include diaphragms failing in less cycles of operation than desirable and diaphragms taking an undesirable set.

In order to provide improvements in valves of the above mentioned type and to overcome and/or minimize problems such as mentioned, this invention has been made.

SUMMARY OF THE INVENTION

A valve has a valve base with a valve body threaded thereto to mount a dome shaped diaphragm for movement between a valve closed position seatable against a valve seat for blocking fluid flow between an inlet in the base and an outlet in the base. A plastic button is mounted by the valve body and abuttable against the diaphragm to move it to abut against the valve seat. The button has a bottom surface that has a concave central portion that is surrounded by a convex annular radial intermediate portion while the diaphragm has a radial outer portion that is flat to be clamped between the base and valve body. In the valve open position, the button central portion is abuttable against the diaphragm central portion. A metal insert is mounted in a button central recess while a plunger is abuttable against the insert and is operated by a suitable actuator for moving the plunger to force the insert and button to their valve closed positions. Advantageously, the diameter of the insert is larger than that of the plunger.

One of the objects of this invention is provide new and novel diaphragm and button means for reducing the required axial stroke of the button for moving the diaphragm from its valve open position to a valve closed position. A further object of this invention is to provide in a valve, a new and novel diaphragm—button arrangement for applying the closing force to the diaphragm at varying radial positions as the diaphragm is moved to its closed position.

DESCRIPTION OF THE PREFERRED EMBODIMENT

Figure 1:
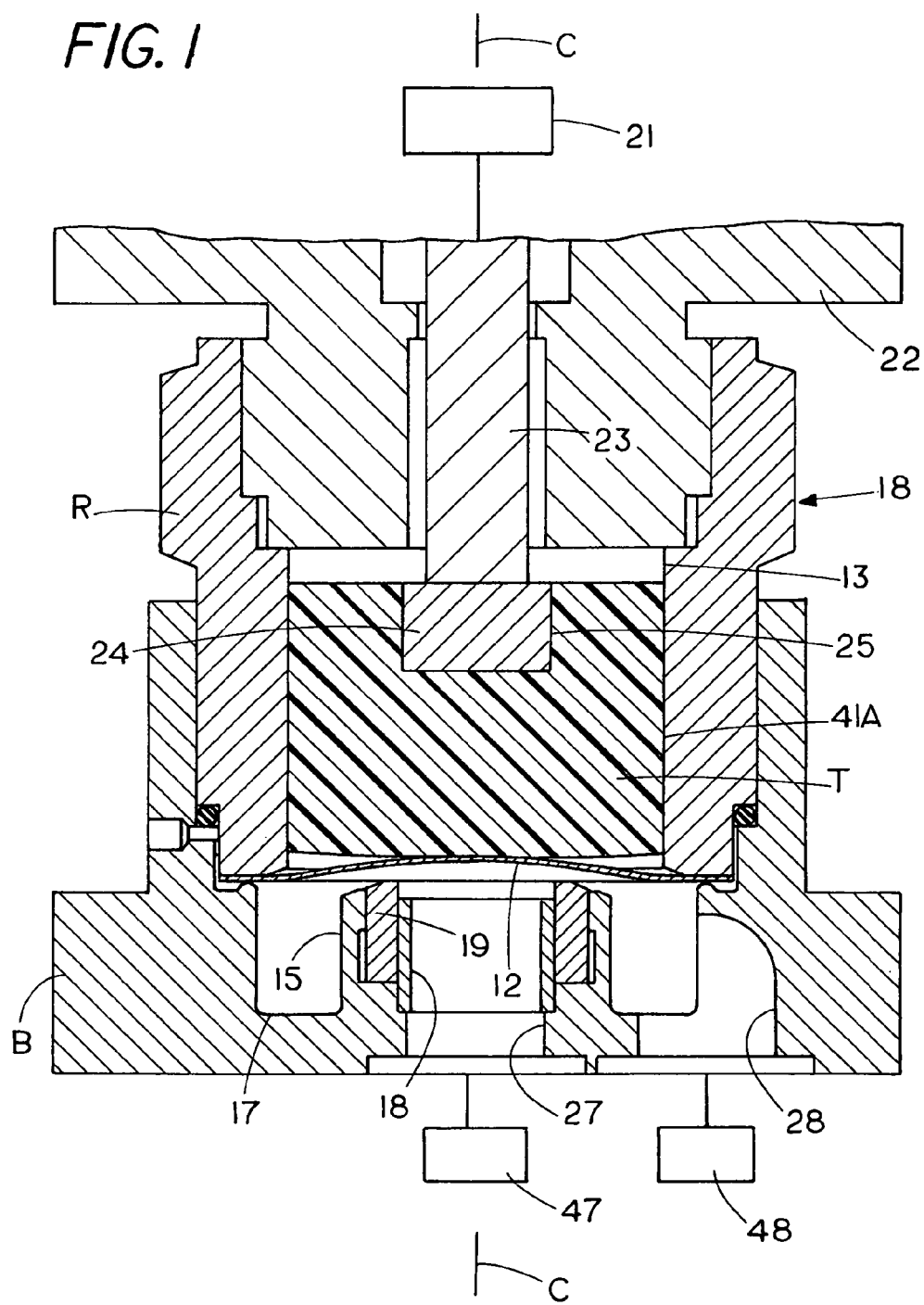
FIG. 1 is a fragmentary longitudinal cross sectional view of the packless valve apparatus of this invention with the valve actuator portion being diagrammatically shown.

Referring to the drawings, the packless valve apparatus includes a base B having a bore, generally designated 10, extending axially therethrough with the lower part of the annular diaphragm retainer R being threaded to the base. The retainer forms part of the valve body, generally designated 18. The base has an annular rib 11 surrounding the base bore for abutting against the radial outer, flat annular portion 12A of an imperforated metal dome diaphragm 12 to clamp it against the radial outer, annular flat portion 14A of the lower edge of the diaphragm retainer R. The lower terminal transverse surface of the valve body has the radial outer flat portion 14A that is generally planar in a plane perpendicular to the central axis C—C of the valve. Advantageously, the inner diameter of the diaphragm flat portion 12A is slightly larger than the inner diameter of the retainer flat portion 14A, but of an outer diameter to fit within the body chamber 17. The retainer has a bore 13 extending axially therethrough. The radial inner annular edge portion 14B of the retainer is beveled to slope radially inwardly in an axial direction away from the rib to allow upward flexing of the adjacent annular part of the diaphragm as the button T is being moved to its valve closed position. As a result of the shape of the bottom surface of the button and the diaphragm, the diaphragm can flex where it wants to and not at a particular location relative to the button.

The base bore is in part defined by an annular boss 15 to provide the upwardly opening annular chamber 17 which opens to the diaphragm. A valve seat mount 18 is press fitted into the part of the base bore that extends through the boss 15 to in turn mount a valve seat 19 to open to the diaphragm and to have its radial inner horizontal flat surface 19B at a higher or at substantially the same elevation as the top of the rib 11 and at a higher elevation than the top surface of the boss 15. The inner and outer diameters of the chamber are greater than that of the valve seat. Further, the bottom surface of the diaphragm portion 12B is at substantially the same elevation as the flat surface 19B of the valve seat. The radial outer part 19A of the top surface of the valve seat is sloped downwardly in a radial outward direction. Thus, advantageously, the uppermost part of the rib, the lower surface of the diaphragm flat portion and the valve seat flat surface (sealing surface) 19B are substantially located in a transverse plane P—P that is perpendicular to the central axis C—C of the valve base and retainer. With high pressure valves, advantageously, instead of surface portion 19A being sloped, it would be a planar continuation of surface portion 19B, the valve seat would be higher to be closer to the diaphragm central portion whereby there is a shorter vertical stroke than for low pressure valves and there may be a plurality of diaphragms in overlaying relationship to one another.

Figure 2:
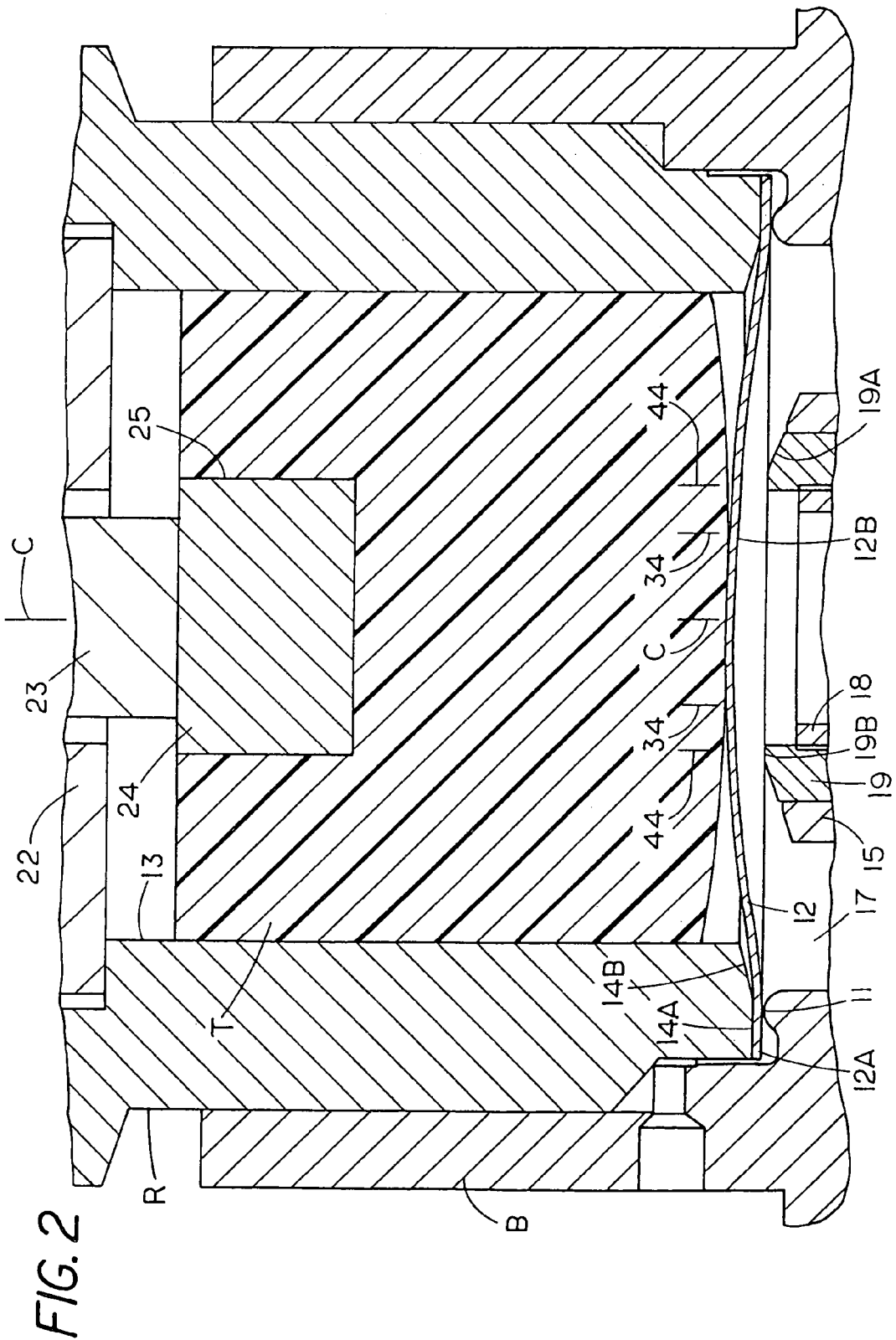
FIG. 2 is an enlarged showing of a fragmentary portion of the apparatus of FIG. 1 with the diaphragm being shown in a valve open position.

The valve body 18 also includes an actuator mount 22 which has its lower part threaded into the upper part of the retainer bore 13. A plunger 23 is axially movable in the actuator mount to extend into the retainer bore to abut against a replaceable metal insert 24 which is mounted in the recess 25 of a generally cylindrical plastic button T. Advantageously, the button may be made of a material having a high tensile strength such as Teflon, an example being one sold under the Trademark Vespel. Since the plunger is not attached to the insert, the plunger is axially movable relative to the insert. Desirably, the plastic is of a type impregnated with a Teflon compound to reduce the coefficient of friction as the button moves axially in the diaphragm retainer bore portion 41A which forms a close fit with the button. The diameter of the insert is greater than that of the plunger and is sufficiently great to distribute the force applied to the button to avoid going beyond the button yield point of compression during use, particularly when the diameter of the plunger is less than the inner diameter of the valve seat. Advantageously, the diameter of the insert is about the same as, or larger, than that of the inner diameter of the valve seat. The button is mounted for axial movement in the lower part 41A of the retainer bore which opens to the dome portion 12B of the diaphragm 12. Mounted to, or in, the valve body is conventional actuator mechanism 21 for controlling the axial movement of the plunger. The actuator mechanism may be a conventional solenoid, or pneumatic, or manually operated valve mechanism for axially moving the plunger to, through the insert and button, move the central part of the diaphragm dome downwardly. The diaphragm is of a flexibility (memory) to resume its valve open, dome shape such as shown in FIG. 2 when the plunger is retracted, or the force acting to move the plunger to its valve closed position is discontinued.

The base bore includes a port 27 that opens through the valve seat mount and the valve seat to the radial central part of the dome portion 12B of the diaphragm while the base has a second port 28 that opens to the chamber 17. The chamber 17, which surrounds the boss 15, opens to the dome portion of the diaphragm radially outwardly of the opening of the valve seat to the diaphragm. When the plunger is in its retracted position, such as shown in FIG. 2, the central part of the diaphragm dome portion extends axially to a higher elevation than the part of the dome portion that is axially opposite the chamber 17.

Figure 3:
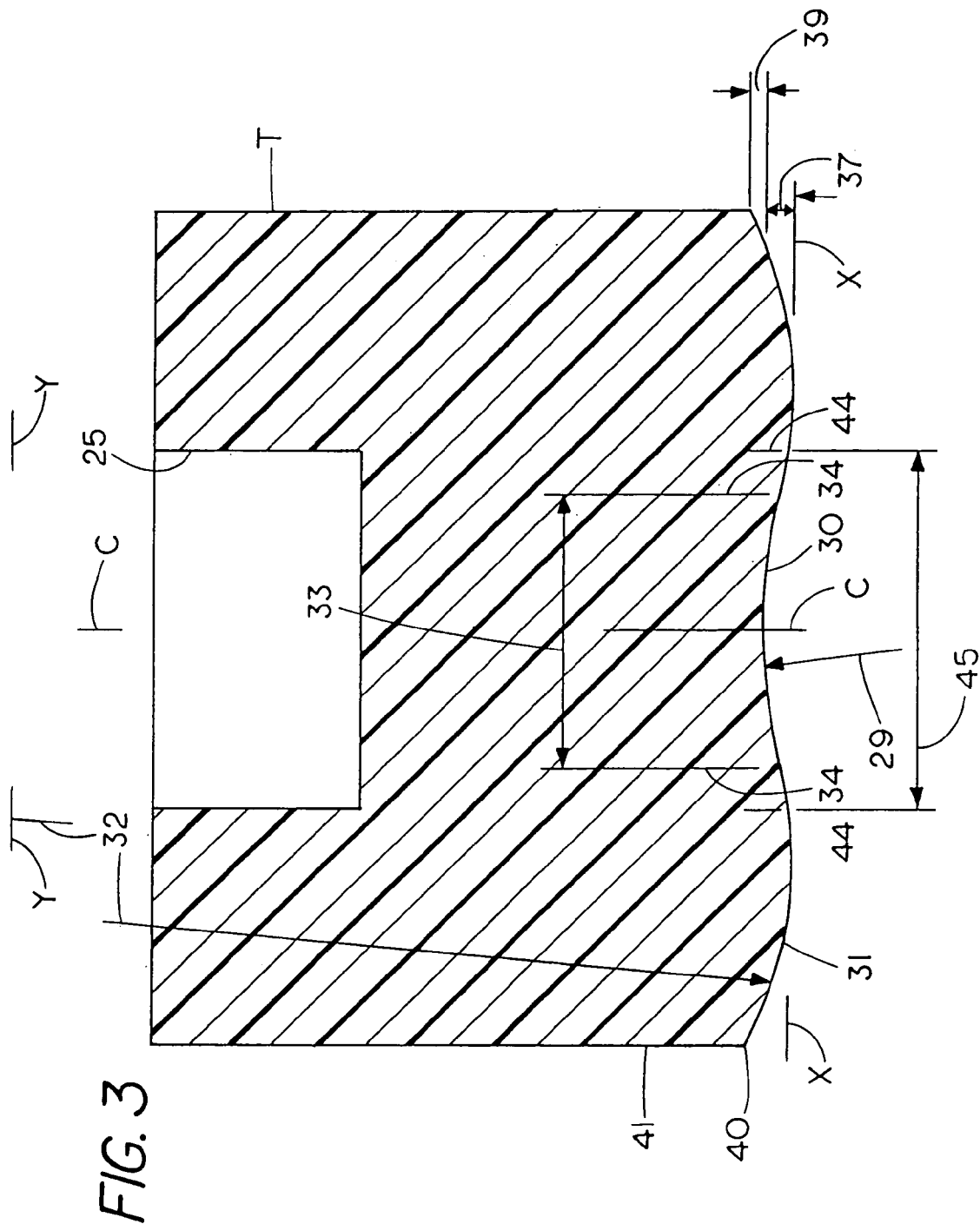
FIG. 3 is a cross sectional view of the valve button.
Figure 4:
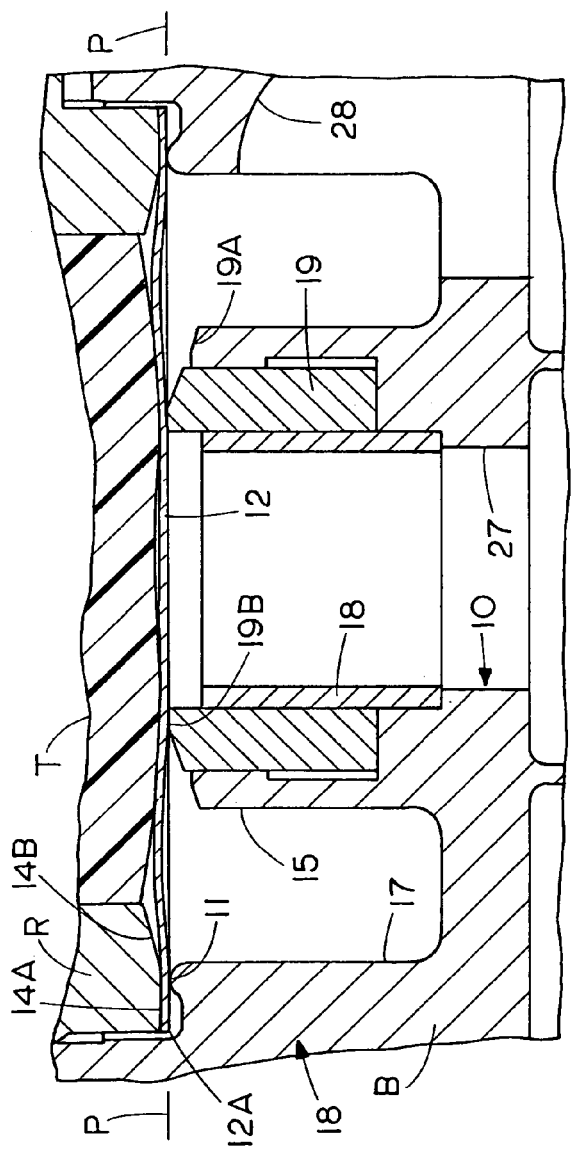
FIG. 4 is an enlarged showing of a fragmentary portion of the apparatus of FIG. 1 with the diaphragm being shown in a valve closed position.
Figure 5:
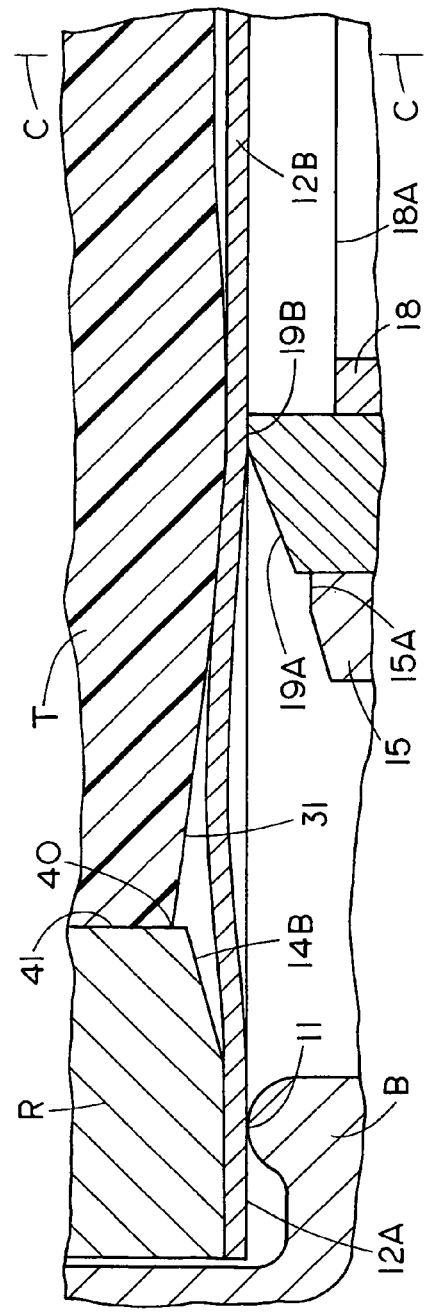
FIG. 5 is a further enlarged, fragmentary cross sectional view of a portion of FIG. 4.

The bottom transverse surface of the button (the surface axially adjacent to the diaphragm) has a radial central part 30 that is curved about a radius 29 that is much greater than that shown in FIG. 3 to be concavely curved. Further, to surround the central part 30, the button bottom surface has a convexly curved annular part 31 that is curved about radii 32 that emanate from a circle in a plane Y—Y that is parallel to plane P—P with the circle being of a diameter between that of the inner and outer diameters of the valve sealing surface 19B or substantially the same as the inner diameter of the valve seat. The radii 32 are much greater than that shown by the radius in FIG. 3 (axial intermediate part of the illustrated radius being broken away) and when parallel to the central axis C—C, advantageously intersect the sealing surface 19B. The dimension 33 indicates the diameter of the transition (juncture) of the concave surface 30 to the convex surface 31, lines 34 indicating the location of the transition from the concave surface 30 to surface 31 as shown in cross section in a plane of the central axis C—C. The diameter 33 of the concave surface is less than the inner diameter of the valve seat.

In the plane of the central axis C—C, advantageously the radius of curvature 29 of the concave portion 30 is greater than the radii 32 of the convex portion 31. The dimension of the radius 32 is set by the stroke length of the button and diaphragm and is of a dimension such that the corner 40 never touches the diaphragm in its closed position, nor during the movement of the button between its valve open and closed positions. Further, in a plane perpendicular to the central axis, advantageously the transverse radial dimension of the convex portion 31 is greater than the diameter of the diaphragm central portion 30 while the outer diameter of the concave portion is less than the inner diameter of the valve seat sealing surface 19B. That is, the outer diameter of the concave portion advantageously is about 15 to 25 percent of the diameter of the button in a transverse plane (perpendicular) to the central axis.

The difference in the elevation of highest part of the concave surface and the lowest part of the convex surface is indicated by the axial dimension 37 and is in the plane X—X tangential to the convex surface and perpendicular to the central axis, the point of the lowest part of the convex surface and the lowest part of the button is being indicated by the intersection of the lines 44 with the button bottom surface. The transverse spacing of the lines 44, such as indicated by dimension line 45, is intermediate that of the inner and outer diameters of the valve seat or equal to the inner diameter of the valve seat whereby the annular part of the diaphragm indicated by an axial extension of lines 44 abut against the valve seat in the valve closed position. The bottom surface part of the button that lines 44 intersect is the part where there is maximum stroke force and during the closing of the valve the diaphragm is bent at this part since it is the lowest part of the button at the point of contact of the diaphragm with the valve seat. Thus, just as the valve is being closed, the closing force is applied to the part referred to in the preceding sentence rather that at the center of the diaphragm and the center of the diaphragm does not have to be move as much as when the closing force is being applied at the center as the diaphragm contacts the valve seat.

Additionally, the circle of intersection 40 of the convex surface with the radial outer peripheral cylindrical surface 41 of the button is at a higher elevation than that of the highest part of the concave surface as indicated by the axial dimension 39 to permit the radial outer part of the dome portion to flex upwardly. Further, the intersection 40 is axially higher elevation than the intersection of the concave surface with the convex surface. Thus, the spacing of the intersection of the cylindrical surface with the convex surface in a plane perpendicular to the central axis and tangential to the annular convex surface portion most remote from the juncture of the concave surface to the convex surface is axially greater than the maximum axial spacing of the concave surface from said plane, The dimension 39 together with that of the radii 32 are such that the button corner 40 does not contact the diaphragm during operation of the valve, nor in either of the valve open and closed conditions. As the diaphragm is pushed to its valve closed position, its radial outer part adjacent the intersection of diaphragm flat portion 12A and dome portion 12B flexes downwardly as the diaphragm moves downwardly to its valve closed position, this flexing providing a spring force urging the diaphragm to move and moving to its valve open position when the plunger moves upwardly.

Due to the contour of the button bottom surface, as the button moves down, the diaphragm bends at different radial outwardly transverse locations whereby the application of the closing force is not constantly being applied to the center of the diaphragm and the points of stress concentration of downward axial closing forces applied to the diaphragm vary. The diaphragm, in moving to its closed position, the application of force from the button is initially from the portion 30 to the central part of the diaphragm, but then progresses to portion 31 to the annular part of the diaphragm that contacts the valve seat sealing flat surface. The central part of the diaphragm can become curved to be more remotely spaced from the transverse center of the button. Also, the outer radial portion of the dome of the diaphragm bends a little (flexes) in the direction of the movement of the button, i.e. flexes downwardly. Thus, the stress resulting from the diaphragm being flexed from its open position, is not concentrated at the center of the diaphragm, but rather moves radially outwardly.

The maximum stroke of axial movement of plunger required for operating the valve is that which is needed to move the diaphragm from the valve open position wherein the transverse center of the diaphragm is at its maximum spacing from the plane of valve seat sealing surface to that wherein an annular part of the diaphragm is in sealing engagement with the sealing surface 19B of the valve seat. The last mentioned annular part of the diaphragm is that which is axially and radially adjacent to the valve seat, said part being that which is the lowermost part of the convex surface in the valve open position. As a result of the curvature of the button bottom surface and the transverse dimensions of the bottom surface relative to the dimensions of the valve seat flat surface and the inner and outer diameters of the chamber 17, the distance the center of the diaphragm has to move (stroke) from the valve open position to the closed position for a given flow rate is substantially less than that required with conventional valves, including those of diaphragms that are flat throughout their transverse dimension. The length of stroke required to control flow is related to diaphragm stress and thus to the life of the diaphragm. The reduction in the length of stroke of the button results in less fatiguing of the diaphragm and accordingly, longer life, which is an important feature. That is, by using the button that strokes the portion of the diaphragm which is going to contact the valve seat, you obtain a longer life for any flow rate, the center of the diaphragm not having to move as far as with other shaped buttons and diaphragm. Further, with the contour of the button bottom surface, there is a greater flow area in the valve open position than there would be if a flat diaphragm of the same diameter were used.

In comparing conventional valves with the valve of this invention that both have the same flow range and the same diaphragm diameters, a longer diaphragm life is obtained using button T as a result of spreading the stress out and stroking the point of contact with the diaphragm whereas with a conventional valve with a curved button or a curved button with a flat surface, the force applied to move the diaphragm is at its center and the stress is being concentrated as bending takes place at the corners of the button that forces the diaphragm down.

When the valve is open, fluid may flow from pressurized source 47, through port 27 to chamber 17 and through port 28 to the unit 48 or alternately, from source 48 to unit 47. The source may be one of pressurized fluid, or may be one for applying a vacuum. With reference to applying a vacuum, it is noted the diaphragm stays in its open position until the plunger is extended, the application of a vacuum not pulling the diaphragm to its valve closed position regardless of which port the vacuum is applied to due to the dome construction of the diaphragm. It is to be noted that due to the fact that as the diaphragm moves to its closed position, the area of the diaphragm to which the application of force from the button is applied, varies in a transverse radial outward direction, any tendency for the diaphragm being permanently deformed is minimized. Accordingly, the application of a vacuum to either of the ports is substantially less likely to force the diaphragm to move from its open to its closed position than when a button of a construction such as disclosed herein is used. Additionally, in stroking the diaphragm with the button T, there may be obtained a higher flow valve with a diaphragm of a smaller area whereby the vacuum is applied to a smaller area.

When the actuator is operated to an off position by manually operating a manual actuator; or deenergizing a solenoid if a solenoid actuator; or the discontinuing of the application of air pressure if a pneumatically operated actuator, for operating the valve to its valve closed position, for a normally closed actuator, there is provided a spring (not shown) which may or may not be part of the actuator for, directly or indirectly through the actuator or part of the actuator, move the plunger up while the resiliency of the diaphragm dome portion moves the button to its valve open position of FIGS. 1 and 2.

What is claimed is:

1. Valve apparatus for controlling fluid flow, comprising a valve body having a central axis, a valve base having a first port and a second port in fluid communication with the first port, a valve seat disposed between the first and second ports for having fluid in flowing from the first port to the second port flow through the valve seat, wherein the flow is surrounded by the valve seat, a diaphragm mounted by at least one of the base and body and movable between a valve closed position blocking fluid through the valve seat from the first port to the second port and a valve open position permitting fluid flow through the valve seat, said diaphragm having a central concave portion opening toward the valve seat, a button having a central axis and mounted for axial movement by the valve body for abutting against the diaphragm to move it from its open position to its closed position, said button having a first surface for abutting against the diaphragm, the button first surface in the valve open position having a central concave portion opening to the diaphragm central portion and an annular convexly curved portion joined to the button concave portion and surrounding the button concave portion for abutting against the diaphragm as the diaphragm is moved from its open position to its closed position and means for moving the button from its valve open position to its closed position.

2. The valve apparatus of claim 1 wherein the valve seat has an annular sealing surface for being abutted against the diaphragm when the diaphragm is in a valve closed position and the diameter of the juncture of convex curved portion to the button central concave portion is between the inner and outer diameters of the sealing surface.

3. The valve apparatus of claim 1 wherein in, a plane of the central axis and when the diaphragm is in its open position, the radius of curvature of the button central portion is greater than that of the button convex portion and in a plane perpendicular to the central axis, the radial dimension of the diaphragm central portion is substantially the same as the radial dimension of the diaphragm convex portion.

4. The valve apparatus of claim 1 wherein, in a valve open position, the button has a peripheral cylindrical surface that intersects with the convex surface and the convex surface are of a radii emanating from in a circle in a plane parallel to a plane which is perpendicular to the central axis that the intersection of the cylindrical surface with the convex surface portion remains out of contact with the diaphragm in both of its valve open and valve closed positions and during its movement between the valve open and valve closed portions.

5. The valve apparatus of claim 4 wherein the convex surface portion has an annular part intersected by said radii extending parallel to the central axis is of a transverse diameter that is about the same as one of the minimum diameter of the valve seat and a diameter intermediate that of inner and outer diameters of the valve sealing surface.

6. valve apparatus of claim 1 wherein the valve body includes an annular boss that opens to the first port and the valve seat is mounted to the annular boss to open to the first port.

7. A valve having a central axis and comprising, a valve seat, a valve base having an inlet and an outlet that are in fluid communication with one another through the valve seat, a diaphragm having an outer peripheral edge portion and a concave central portion opening to the valve seat, a valve body mounted to the valve base to clamp the diaphragm outer edge therebetween and mount the diaphragm to have its central portion move between a valve closed position and a valve open position permitting fluid flow through the valve seat between the inlet and the outlet, a button movable between a valve open position and a valve closed position, the valve body having a bore that includes a bore portion opening to the diaphragm central portion with the button mounted therein for axial movement between the valve open position and the valve closed position to abut against the diaphragm central portion for moving the diaphragm central portion from its valve open position to its valve closed position, the button having a recess axially opposite the diaphragm and an outer peripheral surface of a diameter to form a close sliding fit with the body wall forming the valve body bore portion, a metal insert mounted in the recess to axially move with the button and being of a smaller diameter than that of the button and a diameter substantially the same as that of the recess, and a plunger of a smaller diameter than the insert and axially movably mounted by the valve body for abutting against the insert for axially moving the insert and thereby the button from its valve open position to its valve closed position and being movable relative to the insert.

8. The valve of claim 7 wherein the button has a concave central portion that, in the valve open position, is of a transverse diameter that is smaller than that of the opening of the valve seat to the diaphragm and of a radius of curvature in a plane of the central axis being substantially the same as that of the diaphragm central portion.

9. The valve of claim 8 wherein the button in its valve closed position has a convex portion surrounding the button central portion and is curved about radii of curvature emanating from a circle in a plane perpendicular to the central axis.

10. The valve of claim 9 wherein, in a plane of the central axis, the radius of curvature of the button central portion is greater than each of the radii of curvature of the convex portion.

11. The valve of claim 10 wherein the button has a radial outer peripheral surface that intersects with the button convex surface, the valve seat has a sealing surface in a plane perpendicular to the central axis and in the valve open position, the maximum axial spacing of the button concave surface from the last mentioned plane is less than that of corresponding dimension of said intersection from the last mentioned plane.

12. The valve of claim 11 wherein the button central portion is joined to the convex portion along a circle of transition and that in the button open position, the convex portion has an annular part of minimum spacing from the last mentioned plane, the annular part being of a minimum transverse dimension in a plane perpendicular to the central axis that is greater than the diameter of the opening of the valve seat to the diaphragm.

13. Valve apparatus for controlling fluid flow, comprising a valve body having a central axis, a valve base having a first port and a second port in fluid communication with the first port, a valve seat disposed between the first and second ports for having fluid flow therethrough, a diaphragm mounted by at least one of the base and body and movable between a valve closed position blocking fluid through the valve seat from one of the ports to the other and a valve open position permitting fluid flow through the valve seat, said diaphragm having a central concave portion opening toward the valve seat, a button having a central axis and mounted for axial movement by the valve body for abutting against the diaphragm to move it from its open position to its closed position, said button having a first surface for abutting against the diaphragm, the button first surface in the valve open position having a central concave portion opening to the diaphragm central portion and an annular convexly curved portion joined to the concave portion and surrounding the concave portion for abutting against the diaphragm as the diaphragm is moved from its open position to its closed position and means for moving the button from its valve open position to its closed position, the button concave portion being of a diameter about 15 to 25 percent of the outer diameter of the button in a plane perpendicular to the central axis.

14. The valve apparatus of claim 13 wherein, in a valve open position, the button has a peripheral cylindrical surface that intersects with the convex surface portion and the spacing of the intersection of the cylindrical surface with the convex surface portion in a plane perpendicular to the central axis and tangential to the annular convex surface portion most remote from the juncture of the concave surface portion to the convex surface portion is axially greater than the maximum axial spacing of the concave surface from said plane.

15. Valve apparatus for controlling fluid flow, comprising a valve body having a central axis, a valve base having a first port and a second port in fluid communication with the first port, a valve seat disposed between the first and second ports for having fluid flow therethrough, a diaphragm mounted by at least one of the base and body and movable between a valve closed position blocking fluid through the valve seat from one of the ports to the other and a valve open position permitting fluid flow through the valve seat, said diaphragm having a central concave portion opening toward the valve seat, a button having a central axis and mounted for axial movement by the valve body for abutting against the diaphragm to move it from its open position to its closed position, said button having a first surface for abutting against the diaphragm, the button first surface in the valve open position having a central concave portion opening to the diaphragm central portion and an annular convexly curved portion joined to the concave portion and surrounding the concave portion for abutting against the diaphragm as the diaphragm is moved from its open position to its closed position and means for moving the button from its valve open position to its closed position, the button including a central recess axially opposite the first surface and of a diameter at least substantially as large as the inner diameter of the valve seat, and said means including a cylindrical insert mounted in the recess and a plunger of a smaller diameter than that of the insert and axially movably mounted by the valve body for moving the button from its valve open position to its valve closed position.

16. The valve apparatus of claim 15 wherein the plunger is of a smaller diameter than the inner diameter of the valve seat and the diameter of the concave portion is less than the inner diameter of the valve seat.

17. The valve apparatus of claim 15 wherein the button has a central recess opposite the diaphragm that is of a diameter greater than the diameter of the diaphragm central portion, a metal insert is mounted in the recess, and the above mentioned means includes a plunger mounted by the valve body for axial movement to abut against and move the insert and means is connected to the valve body and is operable for moving the plunger to move the insert and therethrough the button to move the diaphragm to its valve closed position.

18. Valve apparatus for controlling fluid flow, comprising a valve body having a central axis, a valve base having a first port and a second port in fluid communication with the first port, a valve seat disposed between the first and second ports for having fluid flow therethrough, a diaphragm mounted by at least one of the base and body and movable between a valve closed position blocking fluid through the valve seat from one of the ports to the other and a valve open position permitting fluid flow through the valve seat, said diaphragm having a central concave portion opening toward the valve seat, a button having a central axis and mounted for axial movement by the valve body for abutting against the diaphragm to move it from its open position to its closed position, said button having a first surface for abutting against the diaphragm, the button first surface in the valve open position having a central concave portion opening to the diaphragm central portion and an annular convexly curved portion joined to the concave portion and surrounding the concave portion for abutting against the diaphragm as the diaphragm is moved from its open position to its closed position and means for moving the button from its valve open position to its closed position, the valve body having a transverse terminal surface that includes a radial outer annular flat terminal edge portion that is generally planar in a plane perpendicular to the central axis and a radial inner, annular tapered portion that is tapered radially inwardly and axially in a direction away from the valve seat, the diaphragm having a flat radial outer annular portion joined to its central portion and the base having an annular chamber opening to the diaphragm and to the first port and an annular rib surrounding the chamber and abutting against the flat portion for retaining the diaphragm in clamped relationship to the valve body terminal edge portion.

19. The valve apparatus of claim 18 wherein the diaphragm has a surface that is engagable with the button concave surface, the diaphragm central portion in the plane of the central axis is of a radius of curvature that is substantially the same as that of the button concave portion and the button convex portion in the plane of the central axis is of a smaller radius of curvature than that of the button concave portion and in a plane perpendicular to the central axis is of a radial dimension that is substantially the same as the radial dimension of the button concave surface.

* * * * *